United States Patent [19]

Gibbs

[11] 4,372,219

[45] Feb. 8, 1983

[54] MATERIAL HANDLING SYSTEM

[75] Inventor: James W. Gibbs, Hialeah, Fla.

[73] Assignee: Gibbs-Ryder Materials Handling Systems, Inc., Coral Gables, Fla.

[21] Appl. No.: 261,128

[22] PCT Filed: Sep. 17, 1979

[86] PCT No.: PCT/US79/00730

§ 371 Date: May 22, 1980

§ 102(e) Date: May 22, 1980

[87] PCT Pub. No.: WO80/00690

PCT Pub. Date: Apr. 17, 1980

Related U.S. Application Data

[63] Continuation-in-part of Ser. No. 945,056, Sep. 22, 1978.

[51] Int. Cl.³ .............................................. B61B 13/02
[52] U.S. Cl. .................................... 104/165; 104/35; 104/88; 198/782; 414/286
[58] Field of Search ............. 104/35, 48, 88, 130–132, 104/141, 165; 105/29 R, 177; 414/234, 236, 237, 239, 282, 286; 246/378, 433, 454, 465; 198/782, 787; 238/123; 74/422

[56] References Cited

U.S. PATENT DOCUMENTS

| 1,800,785 | 4/1931 | Fairbanks | 246/378X |
|---|---|---|---|
| 2,606,508 | 8/1952 | Van Nes | 105/177 X |
| 2,712,875 | 7/1955 | Leopold | 414/239 |
| 3,390,791 | 7/1968 | Baldwin et al. | 414/237 X |
| 3,408,950 | 11/1968 | Puhringer | 104/141 |
| 3,443,449 | 5/1969 | Kotarski | 74/422 |
| 3,565,233 | 2/1971 | Hinman | 198/782 |
| 3,769,850 | 11/1973 | Culligan | 74/422 X |

FOREIGN PATENT DOCUMENTS

| 262295 | 2/1960 | Australia | 104/35 |
|---|---|---|---|
| 448900 | 8/1927 | Fed. Rep. of Germany | 104/132 |
| 2712494 | 10/1977 | Fed. Rep. of Germany | 198/787 |
| 7921 | of 1894 | United Kingdom | 104/148 |

Primary Examiner—Randolph Reese
Attorney, Agent, or Firm—Hamilton, Renner & Kenner

[57] ABSTRACT

Material handling apparatus for the controlled movement of goods on pallets having wheels for engaging intersecting rails, movable track sections in the intersecting rails underlying the wheels to selectively permit movement of the pallets in two angular directions, and a drive engaging the pallets for selective movement along either of the two intersecting rails. The drive includes a direction control for orienting a pinion to drive the pallet along either of the intersecting rails and a direction control locking device for locking the pinion in position to drive the pallets along either of the two intersecting rails.

41 Claims, 12 Drawing Figures

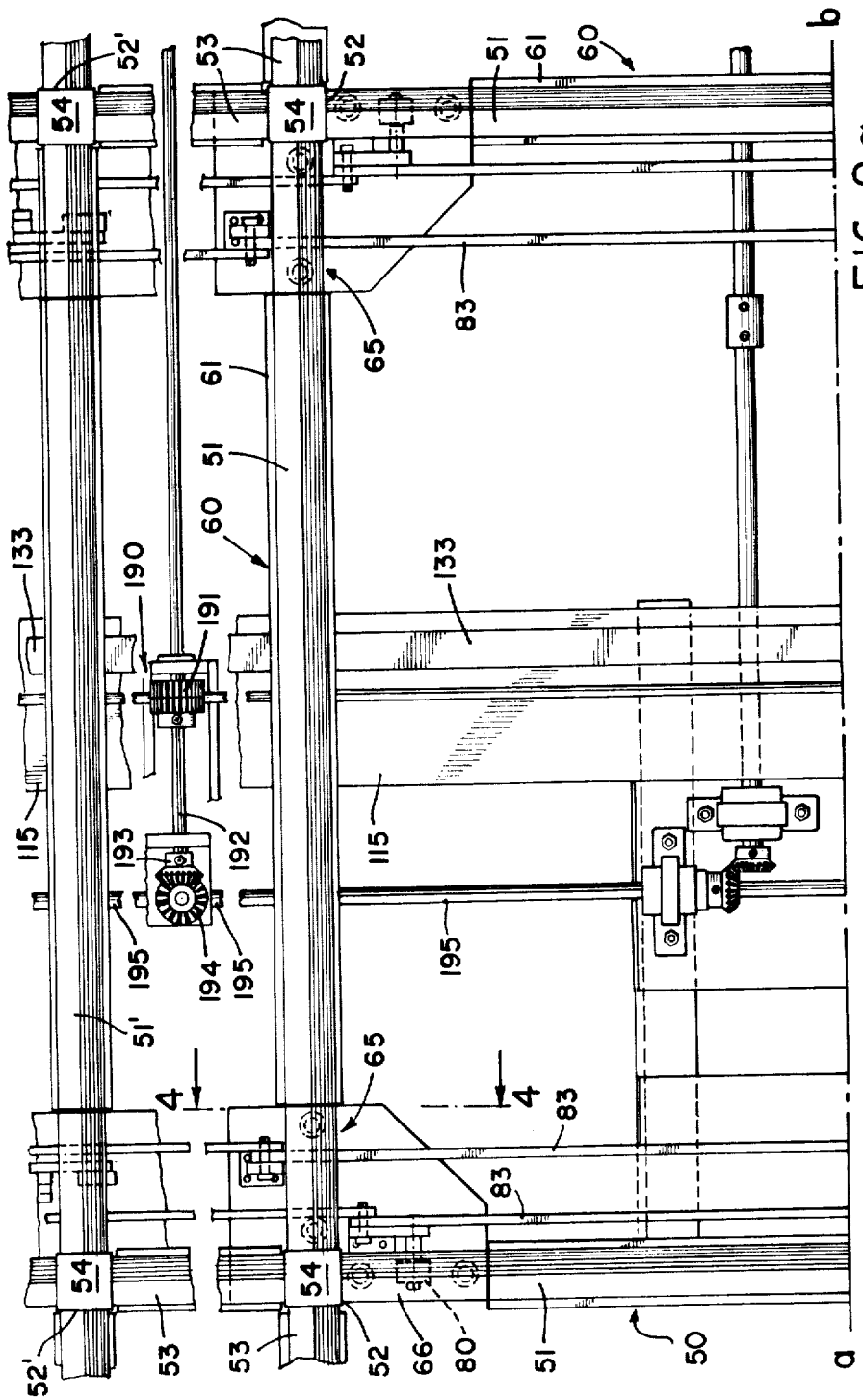

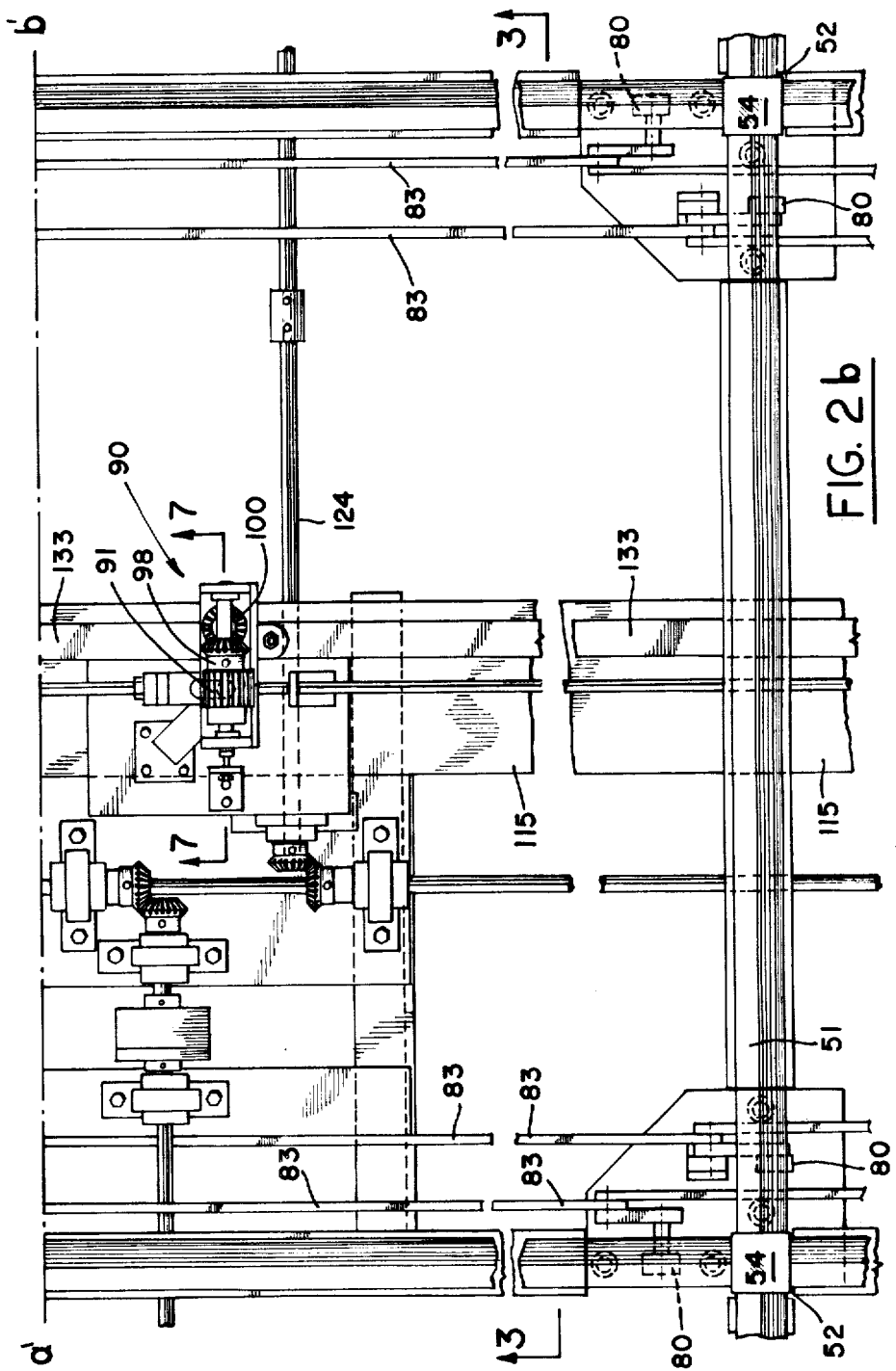

MATERIAL HANDLING SYSTEM

This is a continuation-in-part of my copending application Ser. No. 945,056, filed Sept. 22, 1978, entitled "Material Handling System."

TECHNICAL FIELD

The present invention relates generally to material handling systems for the automated movement, storage and retrieval of goods. More particularly, the invention relates to a material handling system wherein palletized storage and controlled transportation of goods in a variety of environments and configurations is provided. More specifically, the invention relates to a material handling system involving pallets positioned in a plurality of storage rows served by transfer aisles wherein the pallets are selectively moved in the storage rows and through the transfer aisles by a compartmentalized drive system which positively controls the pallets during movements within the system.

BACKGROUND ART

Historically, storage or warehousing of goods or containers of goods has been effected on multilevel arrangements of shelves having limited depth and a great number of intermittent aisles for purposes of effecting reasonable accessibility for placement and retrieval of stored goods. For purposes of handling articles or goods of substantial weight, aisles of excessive width normally have been required for the purpose of permitting passage of heavy equipment of the type required for the transportation and placement of the goods. The end result of such systems is that a relatively small percent of a given size building or enclosure is usable as actual storage capacity.

More recently, efforts have been made to effect improvements in the storage density in a building or enclosure. In this respect, there has been a proliferation of what are termed stacker crane type units wherein loading and unloading devices are movable in aisles via a track or other means of controlled motion to afford transportation and loading and unloading from a plurality of storage spaces. These units are commonly capable of three dimensional positioning and are frequently automated for remote controlled operation. Although effecting some economies in space utilization, these units nevertheless generally require minimal depth rack configurations which are one or in the most advanced installations two positions deep adjacent the crane traverse aisles for purposes of accessibility for storage and retrieval of goods. This marginal space utilization combined with the necessary sophistication of a crane unit produces little overall cost advantage in comparison with conventional storage facilities which have been employed for many years.

Another approach which has gained some consideration involves the use of a plurality of movable pallets which are positioned in close horizontal proximity such that higher density storage is possible. In installations of this nature the pallets are normally movable in one or more directions to one or more service positions whereby an elevator or other device may be employed for retrieval of a particular pallet. Although affording vastly superior economies in terms of storage space per unit of building or enclosure space, these units have not in general enjoyed wide commercial acceptance. A primary problem encountered in conjunction with such systems is the expense produced by the necessity for a great proliferation of the apparatus required to effect movement of the individual pallets in two or more directions. In order to effect optimum space utilization, movement in perpendicular directions to shift the pallets to different positions is normally an absolute requirement. In addition, drive mechanisms are normally proposed for each of the individual pallets with these mechanisms duplicated in many instances to effect independent drive in two perpendicular directions. As a result of the duplication and proliferation of parts necessary to accomplish the requisite movements and driving force therefor, most such systems are characterized by substantial expense.

In addition to the above features, the prior art systems devised to provide pallet movement in two perpendicular directions on planar tracks normally employ wheels oriented in perpendicular directions. In order to provide unimpeded motion in the two directions the prior art has commonly resorted to the use of two different sets of wheels arranged on different vertical levels to engage intersecting multilevel tracks or rails. In other instances, efforts have been made to make at least one set of wheels vertically or pivotally movable such that they may be selectively brought into engagement or disengagement with intersecting rails when travel in one of two perpendicular directions is desired with a fixed set of wheels providing travel in the other direction. Either of these approaches presents certain problems, the former resulting in a lack of versatility and the latter in the use of numerous heavy-duty moving parts to effect the requisite vertical motion of pallets which are laden with extreme loads. In other instances, efforts have been made to provide for lateral motion between one set of wheels and the tracks upon institution of rolling of the other set of wheels on planar intersecting tracks. None of the known prior art devices have to applicant's knowledge provided a totally successful answer in terms of storage density and simple, reliable, and relatively inexpensive apparatus to effect pallet travel in a plurality of directions.

DISCLOSURE OF INVENTION

An object of the present invention is to provide a material handling system which inherently allows a high utilization ratio of storage space to building space in both a floor area and volumetric sense. A further object of the invention is to provide such a system which readily lends itself to modular construction techniques in that systems of the same or different size can be added horizontally, vertically, or in a combination of directions without extensive modification or rebuilding of an existing system. Another object of the invention is to provide such a system wherein a new construction system can use system elements as structural elements of a building. Yet another object of the invention is to provide such a system which is configured so as to greatly facilitate prefabrication, erection, expansion, and disassembly for reassembly in another configuration in a relatively facile manner.

A further object of the invention is to provide a material handling system wherein the aisle space can constitute an unusually small percentage of the entire storage area irrespective of whether homogenous or random selection of pallets is employed. Another object of the invention is to provide material handling apparatus wherein particularly the movable pallets are of extremely noncomplex construction for purposes of withstanding operating and environmental abuse and for purposes of operating in conjunction with or incorporating auxiliary equipment for handling or controlling the environment of the stored goods. Yet another object of the invention is to provide apparatus wherein the pallet wheel configuration or the pallet drive system at all times maintains positive control of all pallets in the system.

Still another object of the invention is to provide such apparatus which permits pallet movements to adjacent positions on a common level without the necessity for vertical displacement of the pallets or any components thereof. A still further object of the invention is to provide such apparatus in a form compatible with various conventional material handling pallet loading and unloading equipment. Still another object of the invention is to provide such apparatus which employs relatively inexpensive components which are duplicative to a substantial extent such that overall construction costs may be minimized. Yet a further object of the invention is to provide such apparatus inherently permitting design characteristics compatible with a long service life and relatively maintenance free operation.

These and other objects, together with the advantages thereof over existing and prior art forms which will become apparent from the following specification, are accomplished by the means hereinafter described and claimed.

In general, a material handling system for the selective storage and movement of a plurality of pallets according to the concepts of the present invention includes a pair of adjacent transfer aisles, a plurality of longitudinally aligned compartments in each of the transfer aisles sized to accommodate the pallets, a plurality of storage rows extending laterally of the transfer aisles, and a plurality of compartments in the storage rows aligned with the compartments in the transfer aisles. The transfer aisle compartments have a track system with intersecting rails engageable by wheels on the pallets with movable track sections in the track system to permit movement of the pallets in two angular directions, the wheels rollably supporting the pallet upon movement along the rails in either of the two angular directions. A pallet drive system in each transfer aisle compartment is positionable to drive a pallet in a selected direction to the compartments in the storage rows or to other compartments in the transfer aisles.

BRIEF DESCRIPTION OF DRAWINGS

FIGS. 2a and 2b, on two sheets, comprise a top plan view of exemplary transfer aisle compartments shown in FIG. 1, line a-b of FIG. 2a joining with line a'-b' of FIG. 2b;

PREFERRED EMBODIMENT FOR CARRYING OUT THE INVENTION

Figure 1:
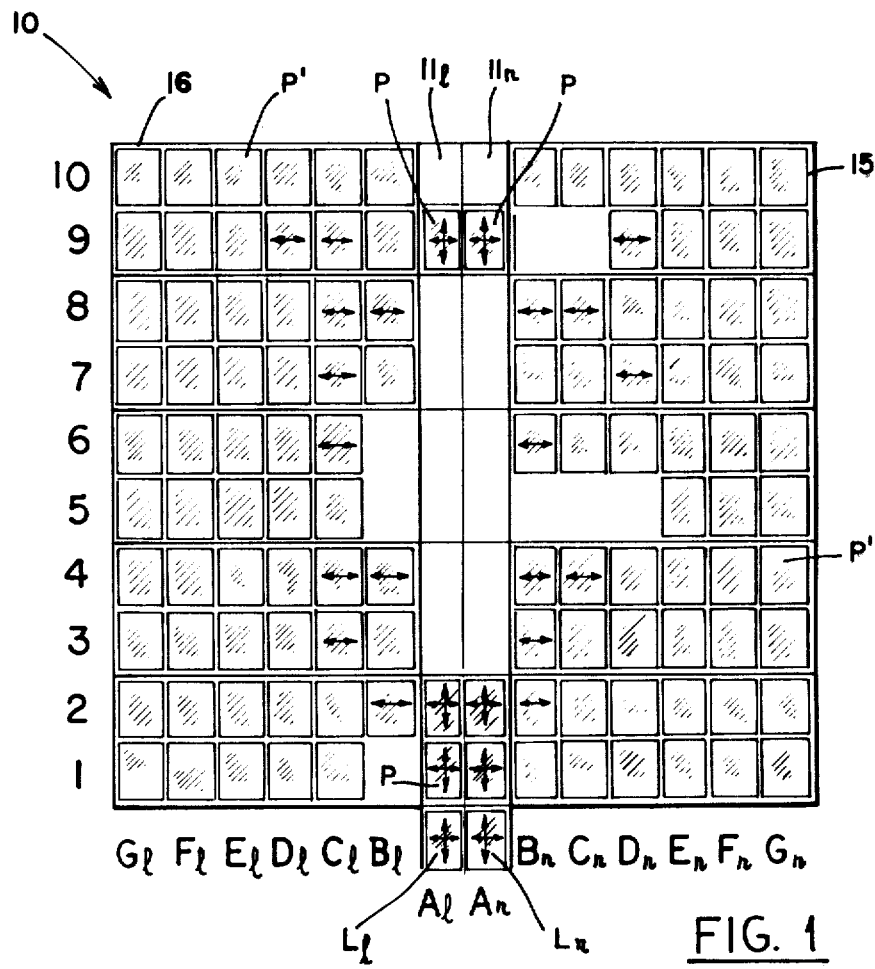
FIG. 1 is a schematic plan view of an exemplary material handling system or a portion of a larger duplicative layout according to the concept of the present invention depicting two adjacent transfer aisles extending from an entry/exit and having a plurality of storage rows arranged perpendicularly to the sides of the transfer aisles which do not abut the adjacent sides thereof and showing compartments in exemplary ones of the storage rows and transfer aisles for the positioning of pallets therein.

Referring now to the drawings and particularly FIG. 1 thereof a preferred configuration for a material handling system according to the concepts of the present invention is generally indicated by the numeral 10. As shown, the material handling system 10 has two adjacent transfer aisles designated $A_l$ and $A_r$ below the lower extremity of the aisles as seen in FIG. 1. In the exemplary configuration each of the transfer aisles $A_l$, $A_r$ has adjacent compartments $11_l$, $11_r$ extending the length of the transfer aisles $A_l$, $A_r$ and being longitudinally adjacent. Corresponding compartments in transfer aisles $A_l$ and $A_r$ are laterally directly aligned as for example the compartments $11_l$ and $11_r$. For exemplary purposes, pallets P are randomly shown in certain of the aisle compartments 11.

Extending laterally outwardly from the transfer aisles $A_l$, $A_r$ are a series of storage rows 15 which are numbered 1-10 for descriptive purposes. Each of the storage rows 15 contains a plurality of compartments 16 which are designated $B_l$-$G_l$ with respect to transfer aisles $A_l$ and $B_r$-$G_r$ with respect to transfer aisle $A_r$. Exemplary pallets P' which may be identical to the pallets P are shown grouped in portions of rows 3, 4, 9 and 10, respectively. The compartments 16 in storage rows 15 are preferably laterally aligned with the compartments $11_l$ and $11_r$ composing the transfer aisles $A_l$, $A_r$. As shown, there are 6 storage compartments 16 to either side of the transfer aisles $A_l$, $A_r$ in each of the 10 storage rows 15, thus providing a total of 120 storage positions in the configuration depicted in FIG. 1.

The compartments $11_l$, $11_r$ of transfer aisles $A_l$, $A_r$ are capable of moving pallets P positioned therein bidirectionally in two mutually perpendicular directions as schematically indicated in certain of the compartments. It is to be understood that the referenced bidirectional movement in two mutually perpendicular or otherwise angularly disposed directions actually contemplates possible motion in four different directions from the compartments, namely two opposed directions along each of two angularly offset intersecting lines. The compartments 16 in the storage rows 15 in the configuration shown provide only for movement within a particular storage row 15 as schematically indicated by arrows on pallets P' reposing in certain of the compartments. Thus, movement of the pallets P' within storage rows 15 can be effected to adjacent compartment 16 within the same storage row, or to a compartment 11 in transfer aisles $A_l$, $A_r$ or a compartment 16 within the row or in the event of a compartment 16 adjacent to the transfer aisle compartments $11_l$, $11_r$.

The depicted configuration in showing six storage row compartments to either side of transfer aisles $A_l$, $A_r$ provides for a reasonably quick storage and retrieval time in the case of employment of a random storage discipline wherein each pallet P in each compartment 16 of a storage row 15 may contain different goods. In the case of a homogenous storage discipline wherein the pallets stored in the portion of a storage row to either side of the transfer aisles all contain identical goods, many additional storage compartments may be provided in each of the storage rows. Even assuming provision for employing the random storage mode, additional compartments could be provided within the operational parameters set forth above. A relatively rapid mode of operation is afforded where intermediate pallets in a storage row may be temporarily transferred to one of the transfer aisles while the last pallet in the storage row is moved along the storage row and out of the storage area via the other of the transfer aisles. Assuming less critical timing considerations such that the pallets may be rotated within the transfer aisles, the number of storage compartments in any row to either side of the transfer aisles could be as many as one less than the number of transfer aisle compartments 11 present in any system 10. Thus in the system depicted in FIG. 1 up to 19 storage compartments could be provided in each storage row to either side of the transfer aisles without provision of remote temporary storage for pallets or the rotation of pallets between adjacent storage rows. It is thus to be seen that the configuration of the system 10 provides substantial flexibility and a high storage to aisle density ratio for a variety of different applications based upon the principles hereinabove discussed.

Depending upon the nature and purpose of the system 10, loading and unloading positions $L_l$ and $L_r$ may be provided at one extremity of the transfer aisles $A_l$, $A_r$. It is to be understood that the loading positions $L_l$, $L_r$ may constitute elevator compartments, system entry stations, or waiting stations for access to elevator compartments or system entry stations and that more or less such positions may be provided depending on system throughput requirements and numerous other factors apparent to persons skilled in the art.

Figure 5:
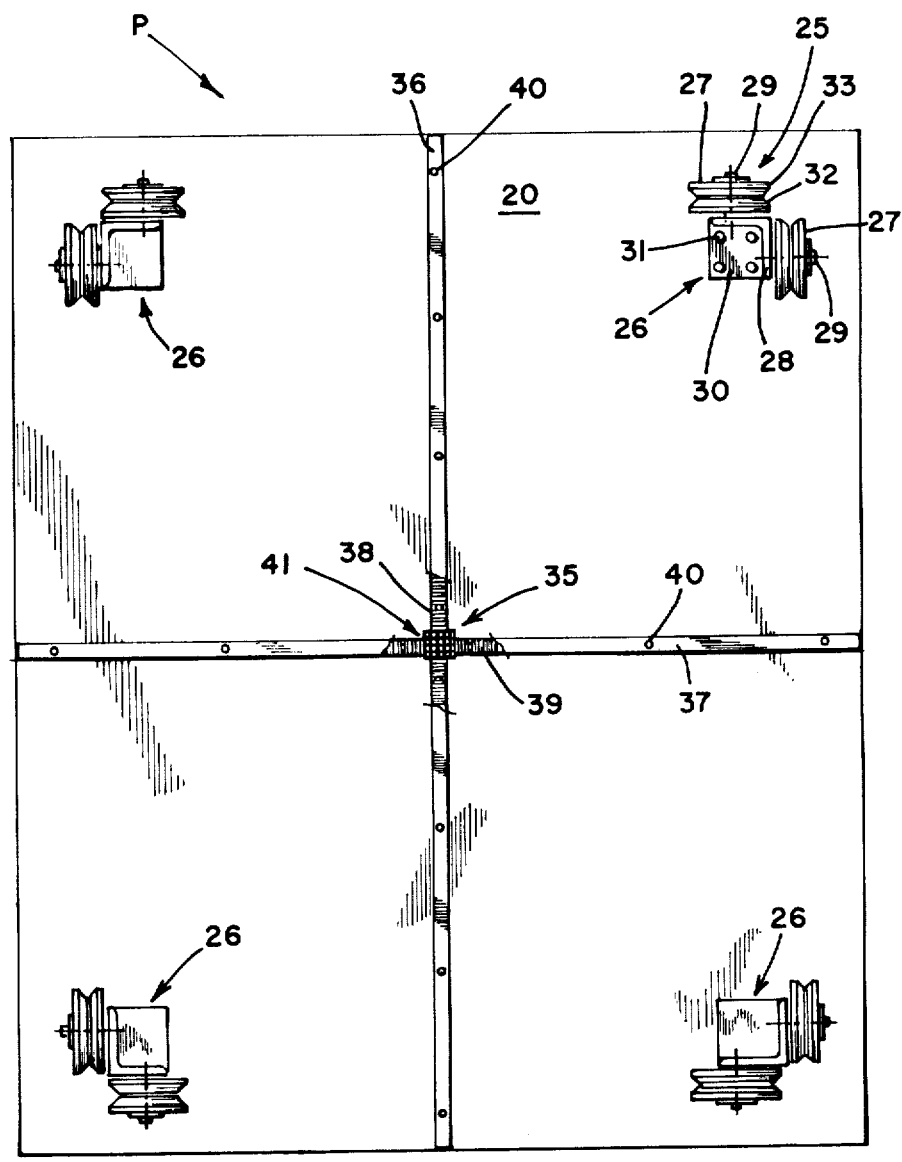
FIG. 5 is a bottom plan view of an exemplary pallet for use in the material handling system showing the corner wheel assemblies and the two direction pallet drive receiver having racks permitting gear drive of the pallet in any of four directions from a position centrally of a transfer aisle compartment.

The goods to be transported in the material handling system 10 are supported by the pallets P, as designated and seen more particularly in FIG. 5 of the drawings.

The pallets P may advantageously be of sturdy but noncomplex design to withstand repetitive loading and unloading with attendant misuse while having a minimum of operating components which might be adversely affected by dirt or foreign matter which may be encountered particularly in loading and unloading areas which are frequently positioned exteriorly of the system. The pallets P, which, for a particular system may conveniently be identical, have a platform 20 which may be the primary load support for goods in the form of containers or otherwise being handled by the system. The pallets P may have restraints such as upstanding rails (not shown) projecting from the top of the platform 20 depending upon the type of goods to be handled to insure the stability of the goods on the pallets P particularly during accelerating and decelerating phases of pallet movement.

Further referring to FIG. 5 the pallets P are provided with running gear, generally indicated by the numeral 25. The running gear 25 for each pallet consists of four wheel mounting assemblies, generally indicated by the numeral 26, positioned preferably proximate each corner of the under surface of the platform 20 such as to provide stability to the pallets P during the movement thereof. Each wheel mounting assembly 26 consists of two wheels 27 which are disposed in spaced fixed relation on perpendicular axes. Preferably, both wheels 27 of each wheel mounting assembly 26 are journal mounted on an angle bracket 28 by an axle member 29 which may take the form of machine screws or other element depending upon design characteristics of the system. The angle bracket 28 is in turn affixed to an attachment plate 30 which is rigidly attached to the undersurface of platform 20 as by machine screws 31. Thus, the axles 29 of the wheels 27 are perpendicularly oriented and spaced from the undersurface of platform 20 such that the lower surface of each wheel 27 of wheel mounting assemblies 26 is presented in a downward coplanar position when a pallet P is operationally positioned within the system.

For a purpose which will be hereinafter apparent each of the wheels 27 of the wheel mounting assemblies 26 has two independent running surfaces. As depicted in the preferred embodiment the wheels 27 have a V-shaped groove 32 constituting one of the running surfaces preferably positioned substantially centrally of the lateral extent thereof. Positioned preferably to either side of the V-shaped groove 32, the wheels 27 have a cylindrical surface 33 constituting a second running surface. Although the groove 32 could be an indentation having a different geometric configuration or could be positioned to either lateral extremity of the wheel 27, the above disclosed configuration is advantageous at least in terms of component availability.

The pallet P has the underside of the platform 20 depicted in FIG. 5 generally unobstructed except for running gear 25 described above and a pallet drive receiver, generally indicated by the numeral 35. The pallet drive receiver consists of two lengths of drive rack 36 and 37 which are preferably planar and extend completely longitudinally and transversely of the undersurface of the platform 20 as seen in FIG. 5. The racks 36 and 37 may be provided with standard teeth 38 and 39, respectively, extending transversely thereof and spaced over the entire length. The racks 36 and 37 are affixed to the undersurface of the platform 20 as by a series of fasteners 40.

Figure 6:
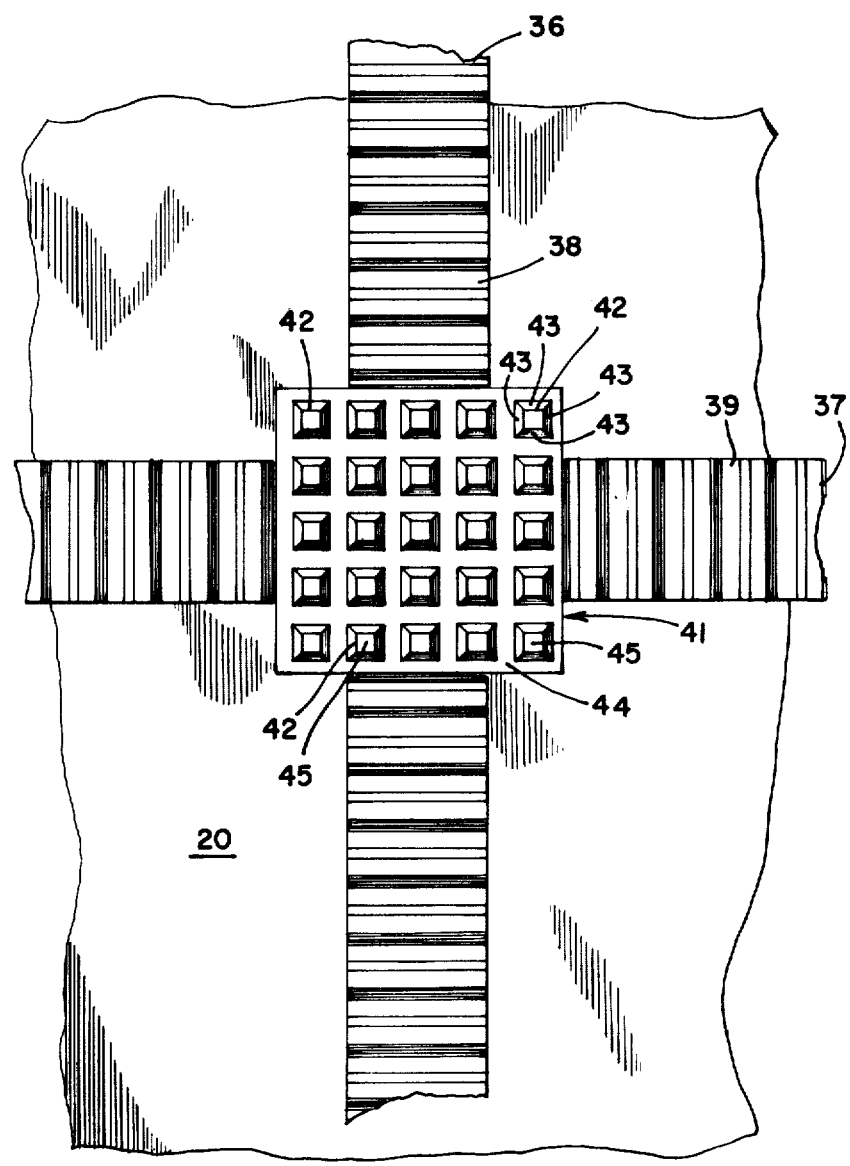
FIG. 6 is an enlarged fragmentary bottom plan view of the pallet of FIG. 5 depicting the central portion thereof and particularly the bidirectional interchange segment located at the intersection of the planar racks.

The racks 36 and 37 of the pallet drive receiver 35 are discontinuous proximate their intersection where a bidirectional interchange segment, generally indicated by the numeral 41 is interposed. The bidirectional interchange segment 41 as best seen in FIG. 6, constitutes a plurality of projecting teeth 42 whose general shape is in the nature of a frustum of a pyramid. Each of the teeth 42 has four identical faces 43 which extend from a base plate 44 attached to the platform 20 and terminate in a flat top 45. The teeth 42, as can be seen in FIG. 6, are positioned in such a fashion that the faces 43 thereof present teeth of identical spacing to the teeth 38 and 39 of the racks 36 and 37, except that the surface presented by teeth 42 is discontinuous and overall of approximately twice the width of teeth 38, 39 of racks 36, 37. Thus, a standard gear designed for mating engagement with the teeth 38, 39 of racks 36, 37 will similarly drivingly engage the teeth 42 in passing across the pallet drive receiver 35 in any of the four possible directions. It is also to be noted that a mating pinion of approximately the width of the base plate 44 will have substantially the same tooth contact area whether engaging teeth 38, 39 of racks 36, 37 or the teeth 42. Thus, with a pinion, rack teeth 38, 39 and the teeth 42 of the bidirectional interchange segment 41 thus appropriately sized, uniform drive forces can be at all times transmitted to the pallet P in a manner hereinafter described.

The pallets P interact with a track system, generally indicated by the numeral 50, to provide the pallet movements described hereinabove in conjunction with the system configuration of FIG. 1. An exemplary transfer aisle compartment 11 providing bidirectional motion of a pallet P together with the interconnection with adjacent compartments is depicted in the view shown in FIGS. 2a and 2b. The track system 50 is arranged in such a manner as to form the plurality of compartments 11, 16 previously described, each of the compartments being of identical size whether square, or rectangular, as shown, and sized comparably to the pallets P so that each compartment is capable of accommodating any one of identical pallets P.

Figure 3:
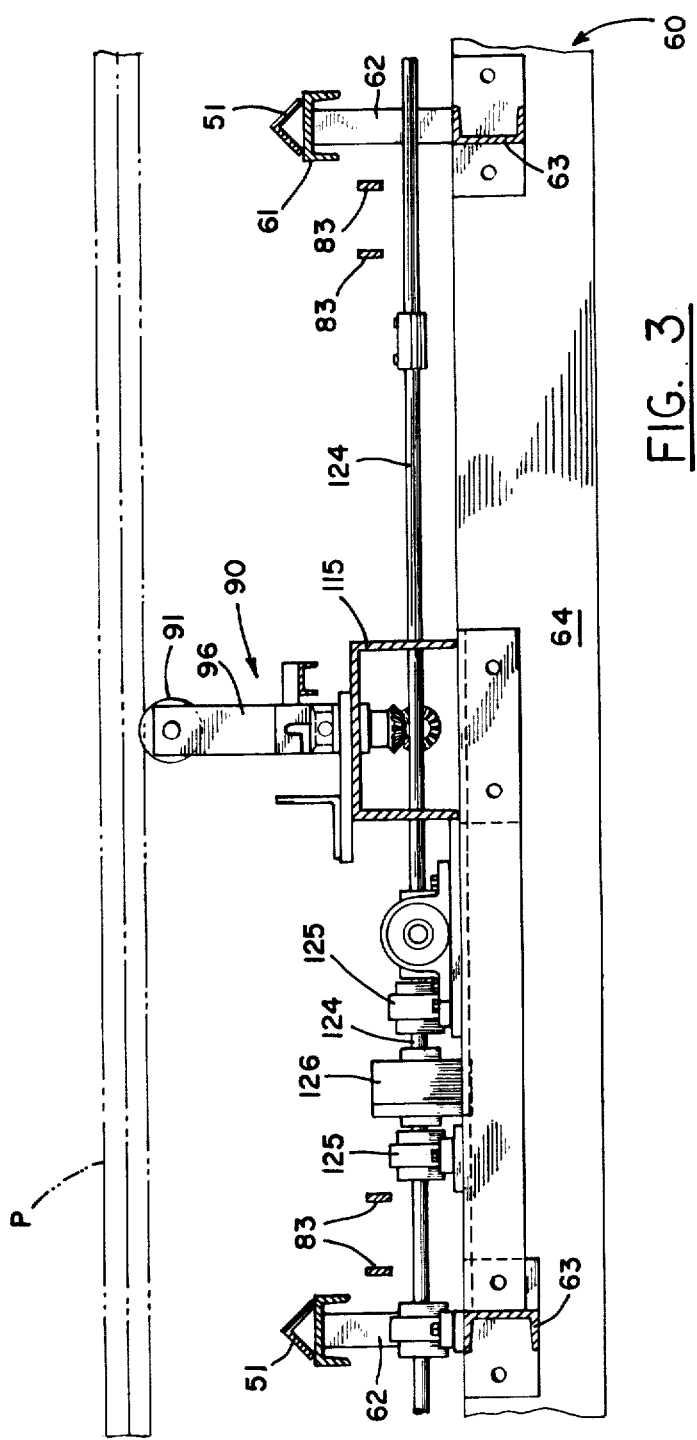
FIG. 3 is a fragmentary elevational view taken substantially along line 3—3 of FIG. 2 showing portions of the track system and a pallet drive mechanism engaging an exemplary pallet, a portion of which is shown in chain lines.

As shown in FIGS. 2a, 2b and 3, the track system 50 is composed of lengths of rails 51 on each side of the compartment 11, the rails 51 on opposite sides of any compartment being substantially parallel to provide mating rolling engagement with four identically directed wheels 27 of any of pallets P, namely, two sets of coplanar wheels having the plane of each set paralleling the plane of the other set as seen in FIG. 5. Mating engagement between the wheels 27 and the rails 51 is insured throughout the extent of the rails 51 by virtue of the inverted V-shaped configuration of the rails 51 which receive the V-shaped grooves 32 constituting one running surface of wheels 27 (see FIGS. 3 and 5).

As best seen in FIG. 2a, each of the rails 51 terminates proximate interchanges 52 located at each corner of the compartments. In instances where there is an adjacent compartment, connecting rails 53 are disposed on the opposite sides of the interchanges 52 from the rails 51. The connecting rails 53 are of the inverted V-shaped configuration of the rails 51. Since movement in two directions is contemplated across the interchanges 52 they upwardly present a flat planar surface 54. The flat planar surfaces 54 are adapted to engage the cylindrical surfaces 33 of wheels 27 of the pallets P. Thus, the interchange 52 readily permits the passage of wheels 27 of pallets P thereacross in any of four directions. The connecting rails 53 are of limited extent and terminate in interchanges 52' depicted at the top portion of FIG. 2a which constitute interchanges of an adjacent compartment and are joined by a rail 51' constituting one side of the adjacent compartment. The connecting rails 53 are of a lineal extent to accommodate the overhang of the pallets P outwardly of the wheels 27 between adjacent compartments and afford any desired clearance therebetween.

The track system 50 is supported by suitable structural framing, generally indicated by the numeral 60 in FIGS. 2 and 3. The configuration and characteristics of the structural framing are matters of engineering design depending upon numerous factors such as the size and weight of the articles to be handled, the number and size of compartments on a level, the presence or absence of multiple levels and other factors which would be apparent to persons skilled in the art. For exemplary purposes the rails 51 are attached to and rigidly supported by U-shaped channel beams 61. The channel beams 61 are intermittently attached to upright supports 62 which repose atop channel beams 63 which are attached to a principal support member 64.

Figure 4:
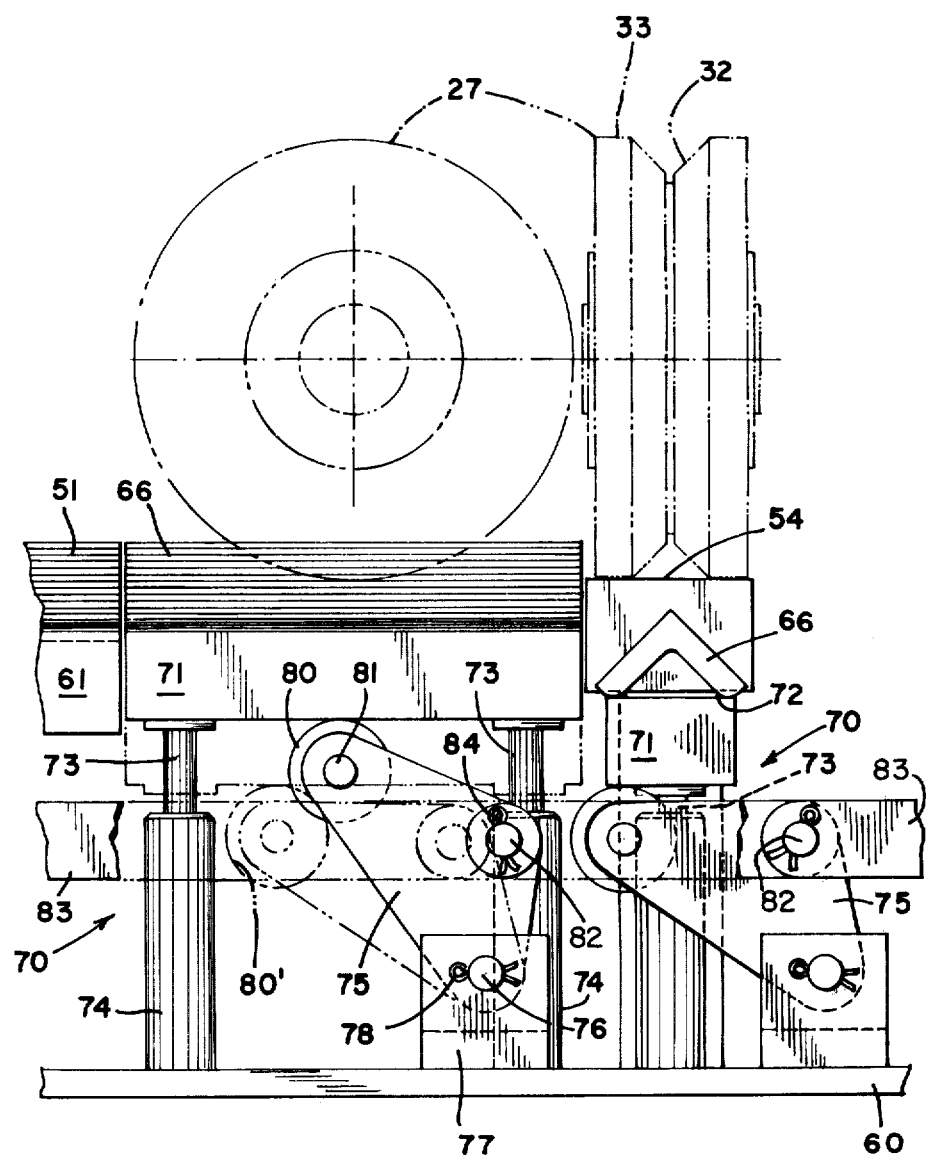
FIG. 4 is an enlarged elevational view taken substantially along the line 4—4 of FIG. 2 depicting particularly the track system movable interchange sections in the track aligned and retracted positions in relation to exemplary pallet wheels which are depicted in chain lines located at a corner of a pallet.

The aforementioned bidirectional movement of pallets P in mutually perpendicular directions on the track system 50 is made possible by removable track sections, generally indicated by the numeral 65, which are interposed between each of the extremities of the rails 51 and the interchanges 52. The removable track sections 65 are thus positioned in such a manner as to underlie each of the wheels 27 of a pallet P centered in a compartment 11. As can be seen from FIGS. 2 and 4 the removable track sections 65 have rails 66 having the same configuration as the rails 51 for purposes of providing a continuous rolling surface for engagement by the V-shaped grooves 32 constituting one running surface of the wheels 27. When the rails 66 are thus aligned with the rails 51, the extremity of rails 66 adjacent the interchanges 52 are of such a height that the wheels 27 of a pallet P passing from the rails 66 to the flat planar surface 54 of the interchange 52 makes a smooth linear transition without vertical offset.

A pallet P reposing in a compartment 11 thus has each of the eight wheels 27 thereof normally supported by rails 66 of the eight movable track sections 65 reposing thereunder. It is to be seen that a pallet thus positioned in a compartment with the rails 66 aligned with the rails 51 is in a locked position by virtue of the perpendicular orientation of the two sets of wheels provided on each pallet P. Thus, the wheel configuration of pallet P coupled with the removable track sections 65 provide an automatic locking feature capable of maintaining pallets P locked in the compartments 11.

In order to permit the bidirectional movement of the pallets P the capability of selectively moving the removable track sections 65 underlying either of the two sets of wheels of a pallet P is provided. The requisite movement of the movable track sections 65 is effected by an actuating assembly, generally indicated by the numeral 70 provided with respect to each of the movable track sections 65. Each actuating assembly 70 includes a support block 71 to which the rails 66 are attached as by welds 72. The contemplated retractability or vertical movement of the removable track sections 65 is effected in an alignment sense with respect to rails 51 and interchanges 52 by a pair of alignment rods 73 which project from the underside of the support block 71. Each alignment rod 73 is received in a cylindrical guide housing 74 which may be mounted to an element of the framing 60. Thus, movement of the rails 66 is necessarily directly vertical.

The extent of the movement of removable track sections 65 is effected by a triangular control link 75. The link 75 has one corner thereof pivotally mounted on a shaft 76 extending from a block 77 mounted on a frame element 60. The link 75 is maintained on shaft 76 as by a cotter key 78 or other suitable fastening technique. A movable contact roller 80 is freely rotatably mounted on a shaft 81 at a second corner of the triangular link 75. The movable contact roller 80 engages the undersurface of the support block 71 carrying the rail 66. The third corner of the triangular link 75 is connected to an actuating rod 83 as by a stub shaft 82 and cotter key fastener 84. Horizontal displacement of the actuating rod 83 thus pivots the triangular link 75 about the shaft 76 to move the contact roller 80 from the solid line position depicted in FIG. 4 to the chain line position shown at 80'. The movable track sections 65 are thus vertically displaced between the depicted positions by movement of the actuating rod 83 which may be remotely controlled by hydraulic or pneumatic actuators (not shown) as will be apparent to persons skilled in the art.

The actuating assemblies 70 may be individually controlled or may be interconnected as by connecting actuating rods 83 to two or more actuating assemblies 70, best seen in FIG. 2, to provide instantaneous actuation of a plurality of actuating assemblies 70 controlling those involving one set of pallet wheels or perhaps the corresponding actuating assemblies in adjacent compartments to which a pallet is to be moved. It is to be noted that in the retracted position, the rails 66 lie below the cylindrical surfaces 33 of wheels 27 such as to provide unobstructed lateral motion of a wheel 27 thereabove.

The pallets P might be moved between the various transfer aisle compartments 11 as hereinabove described by any of a number of known propulsion systems; however, a novel pallet drive system, generally indicated by the numeral 90, in FIGS. 2b, 3, 7 and 8 is particularly advantageous for use in conjunction with the components of the material handling system 10 of the present invention and perhaps otherwise advantageous in conjunction with systems having to some extent common design characteristics. A pallet drive system 90 is provided with respect to each of the transfer aisle compartments and may be otherwise employed in instances where bidirectional movement from a particular compartment is desired.

Figure 7:
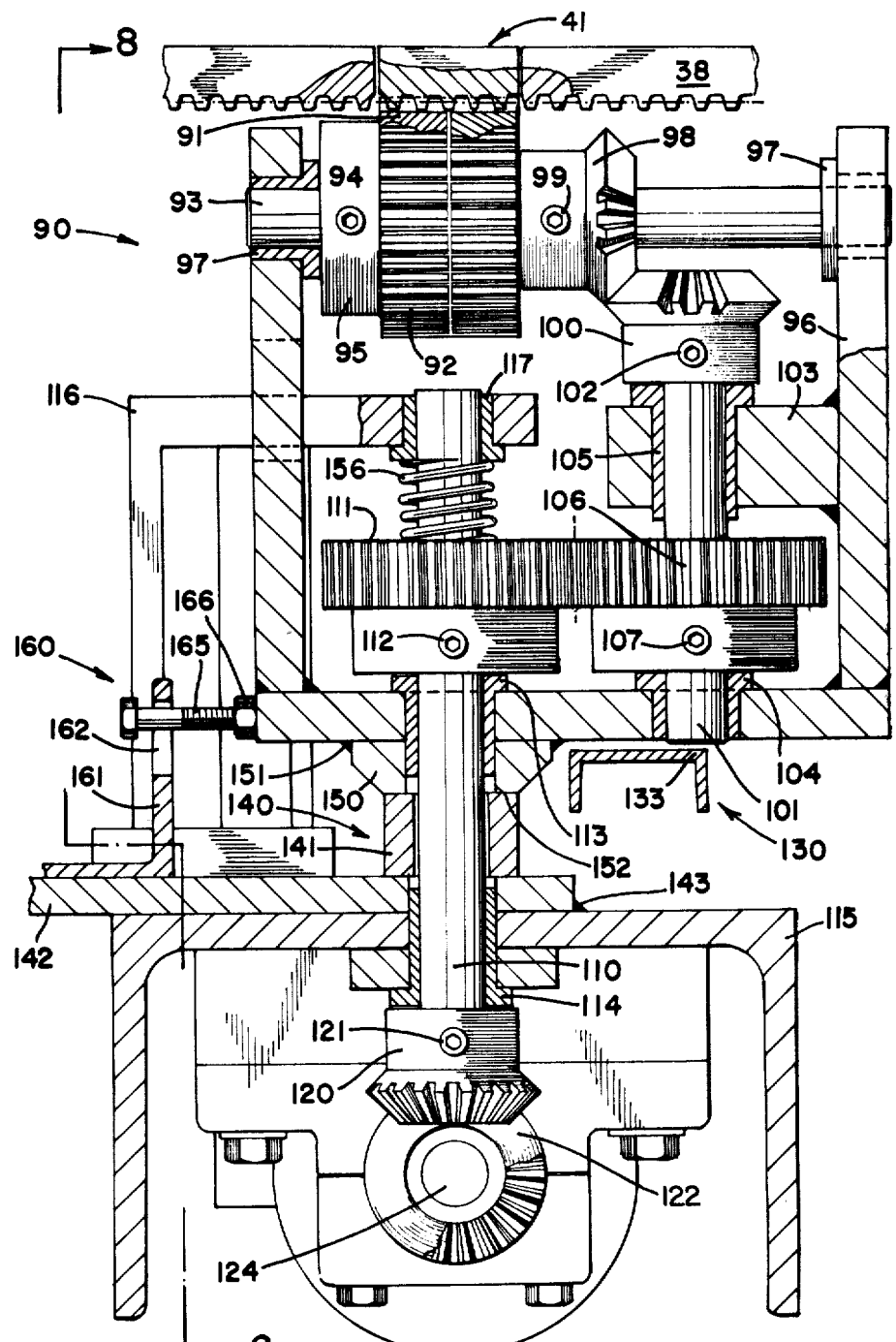
FIG. 7 is an enlarged vertical sectional view taken substantially along the line 7—7 of FIG. 2 showing details of the pallet drive mechanism.

As seen generally in FIGS. 2 and 3 the pallet drive system 90 has a drive pinion 91 which is mounted substantially centrally of the compartment formed by the rails 51. The drive pinion 91 is positioned as hereinafter described to engage the pallet drive receiver 35 and particularly the racks 36 and 37 thereof. When a pallet P is centered in a compartment the drive pinion 91 engages the bidirectional interchange segment 41 as seen in FIG. 7. The drive pinion 91 is preferably provided with teeth 92 which are of the width of the base plate 44 of the bidirectional interchange segment 41 to impart uniform drive forces to the pallet P at all times, as hereinabove indicated in conjunction with the discussion of the pallet configuration. The term pinion shall herein encompass gears having various teeth outlines or configurations depending upon system design requirements including worm gears of limited axial extent. The drive pinion 91 is mounted on a pinion drive shaft 93 to which it is nonrotatably secured as by a set screw 94 in a collar 95 of the drive pinion 91. The pinion drive shaft 93 is mounted in the projecting extremities of a generally U-shaped yoke 96. The shaft 93 may be supported in yoke 96 by identical bearing inserts 97 positioned in the yoke 96.

The pinion drive shaft 93 is driven by a bevel gear 98 which is nonrotatably attached to the shaft 93 as by a set screw 99. Bevel gear 98 is matingly engaged by a bevel gear 100 which is mounted on a perpendicularly oriented offset drive shaft 101. A set screw 102 insures rotation of the bevel gear 100 with the offset drive shaft 101. The offset drive shaft 101 is supported in the base of yoke 96 and a projecting support block 103 attached thereto, preferably in bearing inserts 104 and 105, respectively. The offset drive shaft 101 is driven by a spur gear 106 which is nonrotatably attached thereto as by a set screw 107.

The offset drive shaft is coupled to and driven by a main drive shaft 110 having a spur gear 111 attached thereto by a set screw 112 which matingly engages the spur gear 106 of offset drive shaft 101. The main drive shaft extends through the base of yoke 96 where it is supported by a bearing insert 113 and is further supported and mounted by a bearing insert 114 carried in a channel beam 115 which may be attached to structural framing 60 of the system. The main drive shaft 110 may receive auxiliary support from an L-shaped support arm 116 carrying a bearing insert 117 which receives an extremity of the main drive shaft 110. The opposite extremity of main drive shaft 110 proximate the bearing insert 114 carries a bevel gear 120 which is affixed to the shaft by a set screw 121. The bevel gear 120 matingly engages a bevel gear 122, attached as by a set screw 123, to a system drive shaft 124. The system drive shaft 124 may be supported by pillow blocks 125 and be actuated through clutches 126 and other gears as necessary for providing a desired speed and direction of rotation of the drive pinion 91 through the elements hereinabove described.

The pallet drive system 90 also has a drive direction control assembly, generally indicated by the numeral 130, which provides selective movement of pallets P in one of the two mutually perpendicular directions permitted by rails 51 in the compartments. For purposes of so driving the pallets P on a selected basis the drive pinion 91 must be capable of being oriented for mating engagement to drive in the direction of one of the racks 36, 37 and reoriented through an angle of 90° when it is desired to drive in the direction of the other of the racks 36, 37. This angular positioning of the drive pinion 91 is effected by selective rotation of the yoke 96 which mounts the pinion drive shaft 93 carrying the drive pinion 91.

Figure 8:
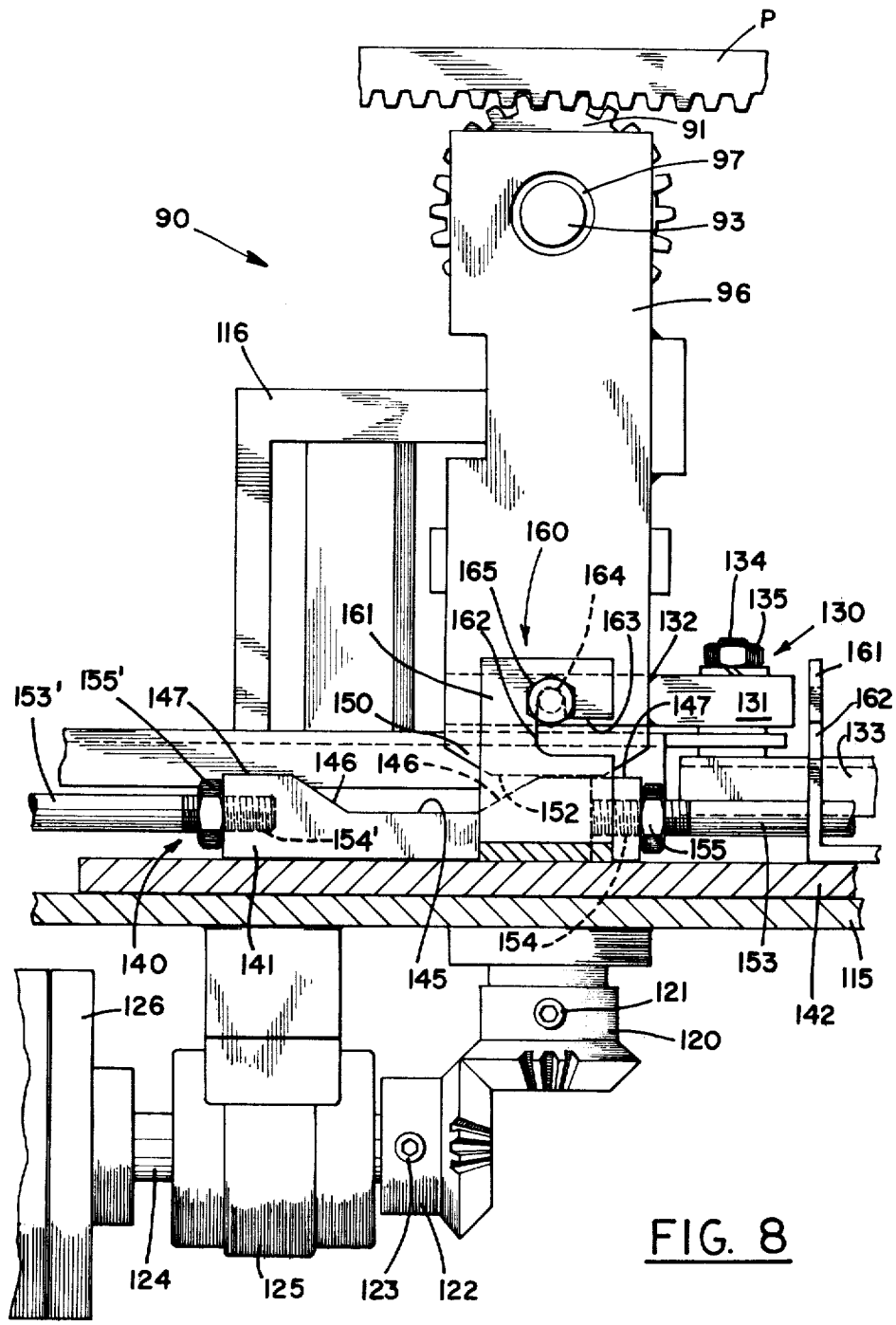
FIG. 8 is an elevational view partially in section taken substantially along the line 8—8 of FIG. 7 depicting additional operating elements of the pallet drive mechanism.

The drive direction control assembly 130 which is best seen in FIG. 8 includes a lever arm 131 which is rigidly attached to the yoke 96 as by welds 132. The lever arm 131 has a rotation control bar 133 attached thereto as by a cap screw 134 extending therethrough and a nut 135. The linear displacement of rotation control bar 133 in a direction longitudinally thereof as best seen in FIG. 2 produces the required 90° rotation of the yoke 96 and drive pinion 91 carried thereby, the spur gear 106 rotating about spur gear 111 during the movement. Rotation control bar 133 may be remotely actuated in any desired manner as will be apparent to persons skilled in the art for purposes of effecting appropriate reorientation in conjunction with actuation of other system components.

In order to permit reorientation of the drive pinion 91 in the manner described hereinabove, a drive pinion lift assembly, generally indicated by the numeral 140, is provided in conjunction with the pallet drive system 90. The drive pinion lift assembly 140 interacts with the drive direction control assembly 130 in that the drive pinion 91 is lowered out of engagement with the bidirectional interchange segment 41, rotated through 90°, and subsequently raised again into contact with bidirectional interchange segment 41 for purposes of effecting drive in a direction perpendicular to the original orientation. The selective raising and lowering of the drive pinion 91 may be conveniently effected by having the drive gear lift assembly 140 selectively vertically position the yoke 96 and the elements affixed thereto.

As shown in FIG. 8 drive gear lift assembly 140 has a cam block 141 which is positioned for lateral motion on a slide plate 142 which may be attached to the channel beam 115 as by a weld 143. The cam block 141 has a central detent 145 which is flanked by ramps 146 which terminate in cam rise surfaces 147. The yoke 96 has a bearing follower block 150 which is attached as by welds 151 to the undersurface of the base of the yoke 96. The bearing follower block 150 has a lower bearing surface 152 which engages the cam rise surfaces 147, the ramps 146 and the central detent 145 of cam block 141 upon horizontal reciprocation of cam block 141 as viewed in FIG. 8.

As viewed in FIGS. 7 and 8, the bearing face 152 of bearing follower block 150 is in engagement with a cam rise surface 147 of cam block 141 such that the yoke 96 carries the drive pinion 91 into mating engagement with the pallet drive receiver 35. The cam block 141 is actuated for movement across slide plate 142 by a cam actuating rod 153 which may be adjustably threaded at 154 to the cam block 142 and locked thereto as by a nut 155. The cam block 141 could be coupled to other cam blocks to be actuated at the same time by a connecting rod 153' similarly adjustably threaded at 154' and locked thereto by a nut 155'.

Upon movement of cam actuating rod 153 to the right as viewed in FIG. 8, the bearing face 152 of the bearing follower block 150 would move down into detent 145 of the cam block 141 and thus effect a lowering of the yoke 96 and drive pinion 91 carried thereby. In the lowered position with the drive pinion 91 out of engagement with the pallet drive receiver 35, the drive direction control assembly 130 can by actuation of control bar 133 effect a 90° rotation of drive pinion 91 without interference with the pallet drive receiver 35.

In order to insure that the yoke 96 lowers when the bearing follower block 150 is positioned in the detent 145 of cam block 141 a compression spring 156 may be positioned on main drive shaft 110 between the spur gear 111 and the bearing insert 117 in support arm 116 as seen in FIG. 7. The spring 156 is depicted in its compressed position in FIG. 7 such that it applies pressure to the yoke assembly 96 to insure appropriate lowering action as the bearing follower block 150 moves downwardly to detent 146 of cam block 141, the spring 156 being compressed during the reverse cycle.

In order to prevent possible inadvertent rotational movement of the drive direction control assembly 130 when the drive gear 91 is driving a pallet P the pallet drive system 90 may be provided with a direction control locking mechanism, generally indicated by the numeral 160 in FIGS. 7 and 8. The direction control locking mechanism 160 consists essentially of two upstanding lock plates 161 each of which may be generally L-shaped and having one leg thereof attached to the slide plate 142 reposing on channel beam 115. As shown, the lock plates 161 have an L-shaped cutout 162 consisting of a generally horizontal slot 163 and a vertical slot 164.

As best seen in FIG. 7 the yoke 96 carries a projecting lock pin 165 which may take the form of a bolt which is adjustably secured by a nut 166. When the drive gear 91 is in driving engagement with a pallet, the lock pin 165 is positioned as depicted in FIGS. 7 and 8 reposing in the vertical slot 164 of the cutout 162 such as to preclude rotation of the yoke 96 about the main drive shaft 110, thus locking the drive pinion 91 in one drive position. When the drive gear lift assembly 140 is actuated to lower the yoke 96 the lock pin 165 moves down the vertical slot 164 of cutout 162. Thereupon, the drive direction control assembly 130 may be actuated to rotate the yoke 96 whereby the lock pin 165 passes out of horizontal slot 163 of a lock plate 161.

As seen in FIGS. 7 and 8, the two upstanding lock plates 161 are positioned substantially equidistant from the main drive shaft 110 and displaced through substantially a 90° angle relative thereto. Thus, as the lock pin 165 moves out of the cutout 162 of the lock plate 161 in which it is positioned in FIGS. 7 and 8, the 90° rotation provided by the drive direction control assembly 130 rotates the lock pin 165 into engagement with the cutout 162 of the second lock plate 161 depicted to the right hand side of FIG. 8 and particularly the horizontal slot 163 thereof. The subsequent actuation of the drive gear lift assembly 140 to raise the drive pinion 91 into engagement with a pallet P moves the lock pin 165 into engagement with the vertical slot 164 of the second lock plate 161 such that the yoke 96 is thus secured in both of the bidirectional drive positions against inadvertent rotation.

It is to be understood that the aforedescribed pallet drive system 90 need only be provided in each of the transfer aisle compartments and otherwise where bidirectional movement to and from a compartment is required. In the context of the material handling configuration disclosed in the preferred embodiment of the present invention, pallet drive system 90 would be required only in conjunction with the transfer aisle compartments 11. With the storage rows contemplating only the movement of pallets P to adjacent compartments within the same storage row, a substantially simplified pallet drive can be employed in the storage compartments, namely, one providing a stationary drive pinion which does not have a drive direction control assembly, a drive pinion lift assembly or the direction control locking mechanism. Such a unidirectional pallet drive system, generally indicated by the numeral 190, is shown in FIG. 2a between the fully depicted transfer aisle compartment having bordering rails 51 and the rail 51' of an adjacent transfer aisle compartment. The unidirectional pallet drive system 190 consists of a drive pinion 191 mounted on a shaft 192 which is driven by a pinion 193 which engages a pinion 194 which is attached to a drive shaft 195 that is connected by intermittent shafting to the system drive shaft 124 which powers drive pinion 91.

By providing a unidirectional pallet drive system 190 between each transfer aisle compartment as depicted for purposes of example in FIG. 2a at least one drive pinion 91, 191 drivingly engages a pallet P at all times during movement between the aisle compartments. With respect to the control of pallets P in the storage rows, unidirectional pallet drive systems 190 may similarly be positioned centrally of each compartment and interposed between each of the compartments in the manner depicted in FIG. 2a. Other arrangements may be employed which would achieve the result of positively controlling the pallets P by a drive pinion 91 or 191 at all times during movements within the system. It is also to be appreciated that the unidirectional pallet drive system 190 when engaging a pallet and not being driven to effect pallet movement can be employed as a locking device to maintain pallets positioned within storage row compartments. This may be of particular significance since storage rows providing only longitudinal pallet travel within a particular row would not require transversely oriented rails 51 or the removable track sections 65.

By virtue of the layout of the pallet drive systems 90, 190, the racks 36, 37 must necessarily in being mounted on the moving pallets P intermittently move into contact with the drive pinions 91, 191. Since substantial lengths of shafting and various gear trains may be interposed between different drive pinions 91, 191, gear tolerances and variations which are manifested as backlash and otherwise may combine to intermittently produce meshing difficulties between the moving racks 36, 37 and the drive pinions 91, 191. It is to be recognized that each of the pinions 91, 191 may be provided with intermittent drives such as clutches 126 which would commence driving only after racks 36, 37 and a particular drive pinion 91, 191 has achieved meshing engagement. Under these circumstances the drive pinions 91, 191 would be freely rotatable to achieve meshing interrelation with racks 36, 37 moving into engagement therewith.

Figure 9:
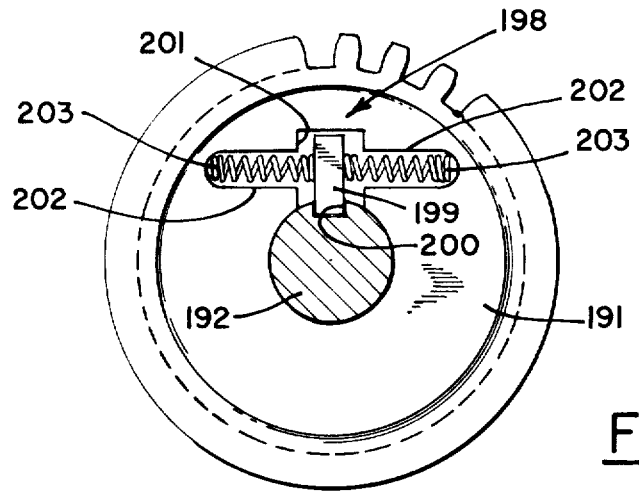
FIG. 9 is a side elevational view of a preferred drive pinion shown mounted on a drive shaft depicted in section of a unidirectional pallet drive system assembly.

It is, however, possible to eliminate a substantial number of clutch devices by providing the unidirectional pallet drive systems 190 with a unique mounting of their drive pinion 191 in a manner depicted in FIG. 9. This mounting permits continuous drive of the shaft 192 carrying drive pinion 191 with a gear rotation assembly, generally indicated by the numeral 198, providing a limited extent of bidirectional rotation of drive pinion 191 relative to shaft 192 to permit meshing engagement of the pinion 191 with a moving rack 36, 37.

The gear rotation assembly 198 consists of a key 199 seated in a slot 200 in the shaft 192. The key 199 is positioned axially of shaft 192 in such a manner as to extend into a radial slot 201 in pinion 191 which is oversized with respect to the width of the key 199 as can be seen in FIG. 9. The slot 201 in pinion 191 has transversely extending channels 202 in the pinion 191 which house opposed coil springs 203. The opposed springs 203 normally maintain the oversized slot 201 of pinion 191 centered about key 199 as depicted in FIG. 9. During the engagement of a rack 36, 37 with a pinion 191, the pinion 191 may rotate a limited extent in either direction relative shaft 192 to effect meshing engagement. Subsequent to effecting meshing engagement with racks 36, 37 of a pallet P the pinion 191 under the biasing influence of springs 203 is substantially returned to the position depicted in FIG. 9. Although as depicted, the pinion 191 may be displaced to either side of the position shown in FIG. 9 through an angle subtending approximately the circular pitch of the teeth of the pinion 191 at the pitch circle, a lesser angular deflection may be sufficient to permit meshing under all circumstances depending upon the design and configuration of the teeth, the tolerances and other design factors.

Figure 10:
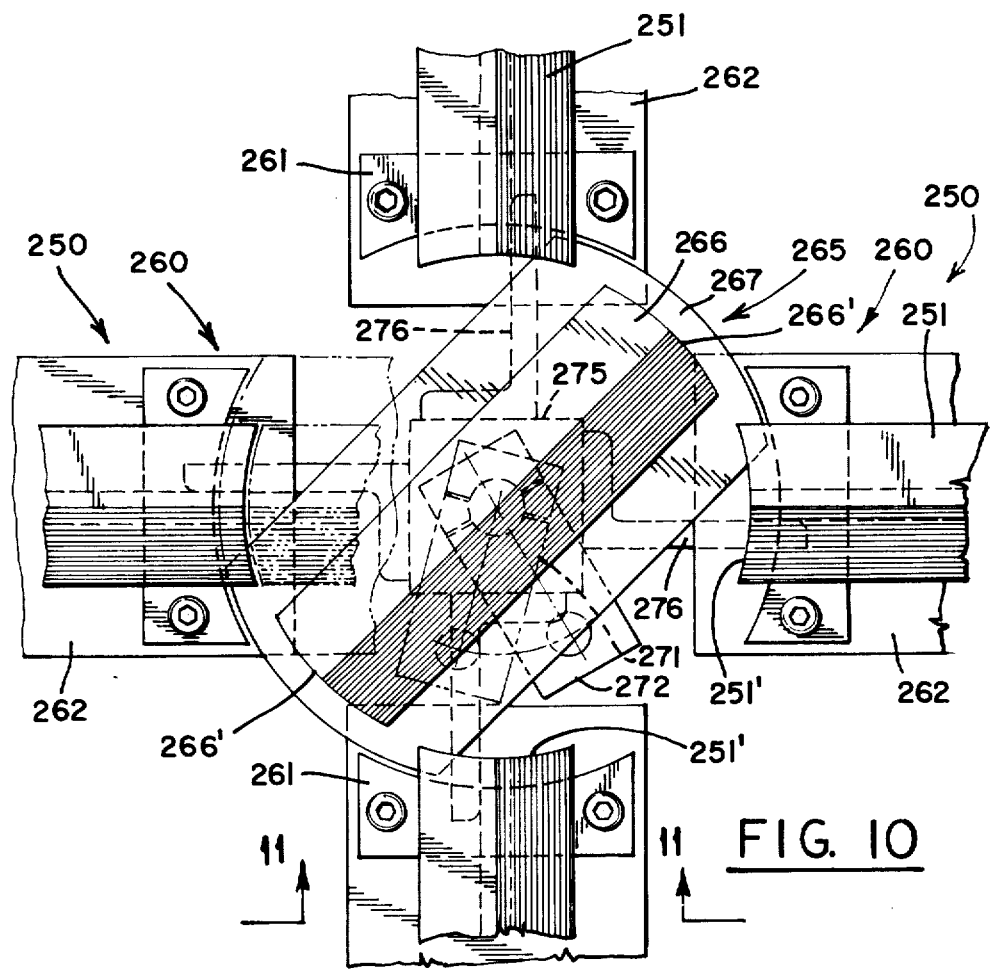
FIG. 10 is a top plan view depicting an alternate embodiment of track system movable interchange sections positioned at the intersection of tracks at a corner of any of the transfer aisle compartments.
Figure 11:
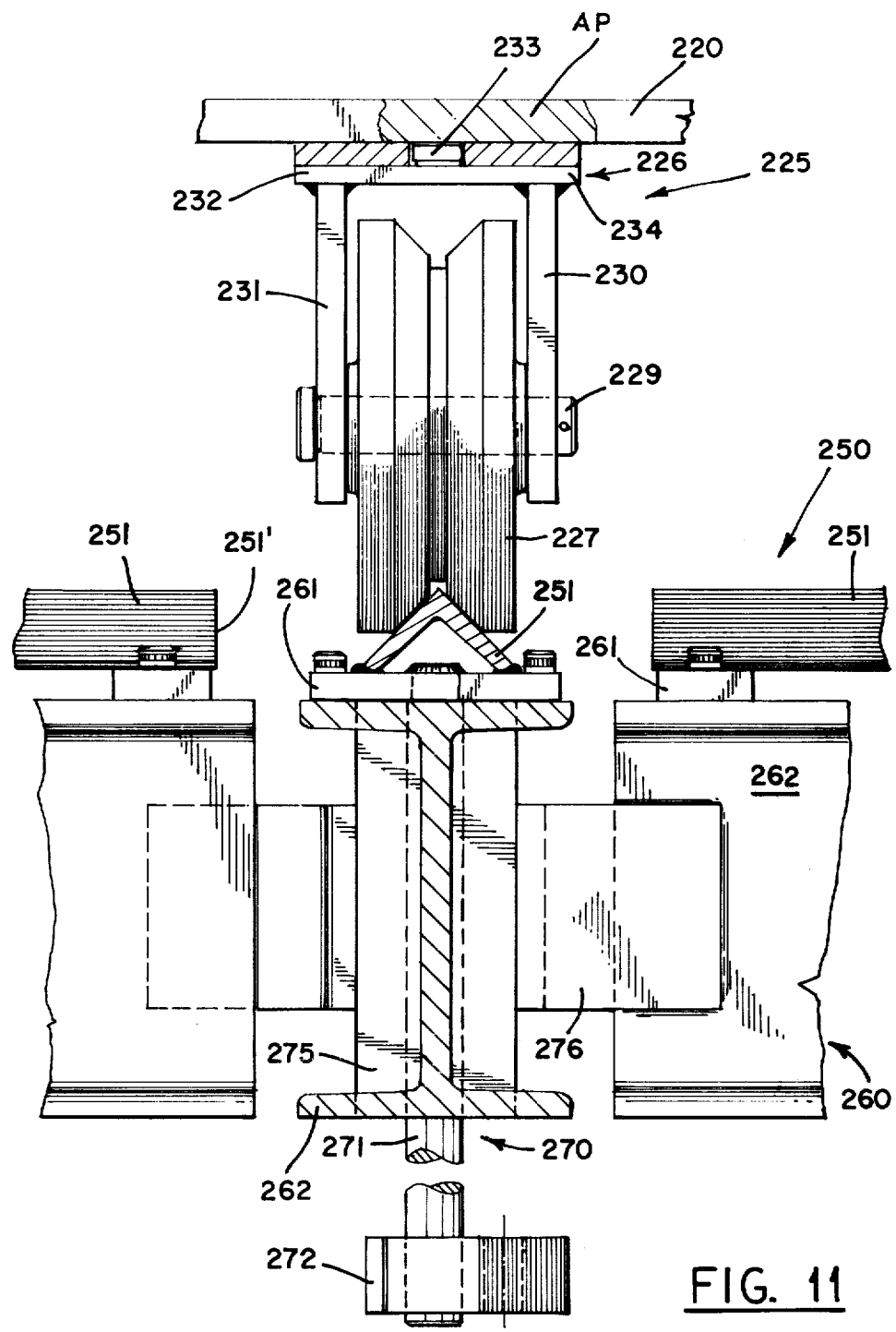
FIG. 11 is an elevational view taken substantially along the line 11—11 of FIG. 10 showing additional features of the alternate embodiment of track system movable interchange sections depicted with an alternate form of pallet wheel configuration employed therewith.

An alternate embodiment of track system movable interchange sections for use with an alternate form of pallet wheel is depicted in FIGS. 10 and 11 of the drawings. As seen particularly in FIG. 11, the alternate pallet AP has a platform 220 with running gear, generally indicated by the numeral 225, consisting of four wheel mounting assemblies, generally indicated by the numeral 226, positioned similarly to the wheel mounting assemblies 26 proximate each corner of the undersurface of the platform 220. In contrast to wheel mounting assemblies 26, each wheel mounting assembly 226 consists of a single wheel 227 which is journaled on an axle 229 supported between bifurcated arms 230 and 231 extending from a base plate 232. The base plate 232 is attached to a shaft 233 carried by a mounting plate 234 attached to platform 220 to provide free rotation of the wheel 227 through 360° about shaft 233. The configuration of wheels 227 may be identical to the wheels 27.

The alternate pallets AP interact with a track system, generally indicated by the numeral 250, which may be identical to the track system 50 except as hereinafter specified. The track system 250 is arranged to form a plurality of compartments in the same fashion as the track system 50. Track system 250 is thus composed of lengths of rails 251 which are of inverted V-shaped configuration to receive the wheels 227 in a manner comparable to the interrelation of rails 51 and wheels 27. The track system 250 may be supported by suitable structural framing, generally indicated by the numeral 260, which may be comparable to the structural framing 60 and employ the same design factors. For exemplary purposes, the rails 251 are shown supported by positioning blocks 261 and I-beams 262.

The requisite bidirectional movement of pallets AP in mutually perpendicular directions on the track system 250 is effected by movable track sections, generally indicated by the numeral 265 in FIGS. 10 and 11. The movable track sections 265 have a length of rail 266 interposed at the juncture of rails 251. The rails 266 preferably have the same configuration as the rails 251 for purposes of providing a continuous rolling surface for engaging the grooved running surface of the wheels 227. As can be seen in FIGS. 9 and 10 the rail 266 may be selectively aligned with either of intersecting rails 251 such as to provide a continuous track in the direction of either of the intersecting rails 251, the rail 266 being shown in an intermediate position aligned with neither of the rails in FIG. 10 of the drawings. The rails 266 may be positioned on a support block 267 or other structural members as appropriate.

In order to permit the bidirectional movement of the pallet AP the selective pivotal movement of movable track sections 265 is effected by an actuating assembly, generally indicated by the numeral 270, provided with respect to each movable track section 265. Each actuating assembly includes a shaft 271 which carries support block 276 and thus the rail 266 mounted in nonrotatable relation thereto. The shaft 271 has a collar 272 similarly non-rotatably attached thereto such that rotational movement of the collar effects controlled rotation of the shaft 271. The collar 272 may be attached to a control rod (not shown) which may be remotely moved by a hydraulic, pneumatic or other actuator (not shown). Thus, rotational actuation of collar 272 as seen in FIG. 10 provides through the shaft 271 selective rotation of rails 266 to effect alignment with the intersecting rails 251. As shown the shaft 271 is journaled in what may be a generally square frame 275. The frame 275 is positioned centrally of the intersection of rails 271 by support blocks 276 which are rigidly attached to both the I-beams 262 and the frame 275.

For purposes of effecting repositioning of a wheel 227 reposing on a rail 266 by actuating assembly 270, the pivot shaft 233 of running gear 225 is substantially aligned with shaft 271, as best seen in FIG. 11. It is to be appreciated that all of the wheels 227 of a pallet AP may be simultaneously reoriented for travel in a particular direction. Alternatively, individual control of actuating assemblies 270 at the corners of a compartment may be provided to allow orientation of some of the wheels 227 of a pallet AP in one direction while others are oriented in other directions to provide an automatic locking feature capable of maintaining pallets AP in stable position in a compartment independently of drive system or other components.

In order to provide minimum spacing between rails 251 and rail 266 and noninterfering pivotal motion of rail 266 in aligning with differing rails 251, the extremities of rail 266 may have a convex surface 266'. The extremities of the rails 251 adjacent the movable track sections 265 have mating concave surfaces 251'. As can be seen in FIGS. 10 and 11 the rails 266 may have the surfaces 266' pivoted into and out of close proximity to the surfaces 251' without interferences therebetween, the convex surfaces 266' and the mating but slightly radially spaced concave surfaces 251' lying upon arcs of circles centered upon shaft 271.

The alternate pallets AP operating in conjunction with track system 250 may be moved relative to the various transfer aisle compartments 11 by any number of known propulsion systems; however a system employing pallet drive system 90 and unidirectional pallet drive system 190, as described in conjunction with track system 50, is also mutually advantageous for use with pallets AP and track system 250.

An embodiment of the present invention has been described in detail by way of example in one exemplary environment. It will be apparent to those skilled in the art that the concepts hereof are applicable in an infinite variety of compartment layouts to effect an equal variety of pallet movements or sequences of movements. Equally apparent is the fact that the operational actuation of elements of the various assemblies and subassemblies may be manually or automatically controlled, as desired, depending upon the design, cost, and other requirements of a particular application of the concepts of the material handling system of the present invention.

I claim:

1. Material handling apparatus for the controlled movement of goods comprising, two intersecting rail means, pallet means for supporting the goods, wheel means mounted on said pallet means for engaging said intersecting rail means, movable track section means in said intersecting rail means underlying said wheel means, means for selectively moving said movable track section means to permit movement of said pallet means in two angular directions, and drive means engaging said pallet means for selectively moving said pallet means along either of said two intersecting rail means, said drive means including drive direction control means for orienting a pinion to drive said pallet means along either of said two intersecting rail means and including direction control locking means for locking said pinion in position to drive said pallet means along either of said two intersecting rail means, said direction control locking means including lock plates having a cutout and said pinion being mounted on a shaft mounted on a yoke, said yoke having a lock pin engaging said cutout in said lock plates.

2. Apparatus according to claim 1 wherein said pallet means has drive receiver means for engagement by said drive means.

3. Apparatus according to claim 2 wherein said drive receiver means comprises planar intersecting rack means for engagement by said pinion.

4. Apparatus according to claim 3 wherein said drive receiver means further comprises a bidirectional interchange segment at the intersection of said racks providing mating engagement with said pinion in the direction of either of said pair of planar intersecting rack means.

5. Apparatus according to claim 4 wherein said bidirectional interchange segment has a plurality of intermittent projecting teeth.

6. Apparatus according to claim 4 wherein said pinion engages said bidirectional interchange segment when said movable track section means underlie said wheel means.

7. Apparatus according to claim 1 wherein said pinion is selectively driven by a gear train providing a selected speed and direction of rotation.

8. Apparatus according to claim 7 wherein said pinion is oriented by rotation through an angle of approximately 90°.

9. Apparatus according to claim 7 wherein said drive direction control means includes a lever arm attached to said yoke and a control bar attached to said lever arm actuable to rotate said yoke.

10. Apparatus according to claim 7 wherein said drive means includes drive pinion lift means for moving said pinion into and out of engagement with said pallet means.

11. Apparatus according to claim 10 wherein said drive pinion lift means has cam means positively displacing said yoke means.

12. Apparatus according to claim 11 wherein said cam means includes a cam block having a central detent and rise surfaces and said yoke has a bearing follower block engaging said cam block.

13. Apparatus according to claim 12 wherein spring means biases said yoke means to maintain said bearing follower block in engagement with said cam block.

14. Apparatus according to claim 1 wherein a plurality of said rail means form a plurality of compartments and said drive means includes a plurality of pinions, at least one pinion engaging said pallet means at all times during travel between adjacent of said compartments.

15. Apparatus according to claim 1 having rack means mounted on said pallet means and said pinion means mounted on a drive shaft, said pinion means being mounted for limited bidirectional rotation relative to said drive shaft to effect meshing engagement when said rack means engages said pinion means.

16. Apparatus according to claim 15 wherein said pinion means is driven on said drive shaft by a key, said pinion means having an oversized slot receiving said key and permitting an extent of rotation of said pinion means about said key.

17. Apparatus according to claim 16 wherein said pinion means is biased to normally maintain said slot centered on said key.

18. Apparatus according to claim 17 wherein opposed springs in said pinion means operate on said key to bias said pinion means.

19. Apparatus according to claim 1 including, at least two pairs of said intersecting rail means, first wheel means for rolling on one of said pairs of intersecting rail means, second wheel means for rolling on another of said pairs of intersecting rail means, said movable track means being removable track section means, said first wheel means rollably supporting said pallet means upon movement in one direction and said second wheel means rollably supporting said pallet means upon movement in the other direction.

20. Apparatus according to claim 19, wherein said removable track section means are adjacent the intersections of said intersecting rail means.

21. Apparatus according to claim 19, wherein said removable track section means underlie each of said first and second wheel means upon initiation of movement in either of the two angular directions.

22. Apparatus according to claim 19, wherein said removable track section means are rails of the configuration of said intersecting rail means.

23. Apparatus according to claim 22, wherein said rails are of inverted V-shaped configuration and said wheel means have V-shaped grooves for mating engagement with said rails.

24. Apparatus according to claim 23, wherein said pallet means are in locked position when said wheel means are engaged by said rails of said removable track section means.

25. Apparatus according to claim 19, wherein said first wheel means comprises two sets of substantially coplanar wheels having the plane for each set of wheels parallel to the plane of the second set of wheels.

26. Apparatus according to claim 25, wherein said second wheel means comprises two sets of substantially coplanar wheels having the plane for each set of wheels parallel to the plane of the second set of wheels.

27. Apparatus according to claim 19, wherein said pallet means is substantially rectilinear and wheel mounting means positioned proximate each corner of said pallet means journal one of said first wheel means and one of said second wheel means.

28. Apparatus according to claim 27, wherein said pallet means includes a platform with said wheel mounting means depending therefrom and mounting said wheel means with the extremities in coplanar relation.

29. Apparatus according to claim 19, wherein said rail means include two pair of parallel rails, each rail means of each pair being perpendicular to both rail means of the other pair.

30. Apparatus according to claim 29, wherein said pairs of parallel rails form a plurality of generally rectilinear compartments sized to accommodate said pallet means.

31. Apparatus according to claim 30, wherein said rail means include extension rails interconnecting similarly directed rails in adjacent of said plurality of generally rectilinear compartments.

32. Apparatus according to claim 19, wherein said means for selectively moving said removable track section means selectively retracts said removable track section means to permit said wheel means to selectively depart laterally of said rail means.

33. Apparatus according to claim 19, wherein said means for selectively moving said removable track section means is a pivotal control link having a roller engaging a support block mounting said removable track section means.

34. Apparatus according to claim 33, including alignment means maintaining said removable track section means aligned between said rail means and the intersection of said intersecting rail means.

35. Apparatus according to claim 34, wherein said alignment means constitutes a plurality of rods restrained in mating guide housings.

36. Apparatus according to claim 19, wherein said intersecting rail means have planar interchanges at the junctures thereof and said wheel means have cylindrical surfaces for engaging said interchanges and grooved surfaces for engaging said rails.

37. Apparatus according to claim 1, wherein said wheel means on said pallet means are rotatable for engaging either of said two intersecting rail means and said movable track section means is interposed at the juncture of said two intersecting rail means.

38. Apparatus according to claim 37, wherein said movable track section means has a rail which is selectively aligned with either of said two intersecting rail means.

39. Apparatus according to claim 38, wherein said rail is pivotally mounted to selectively rotate said wheel means.

40. Apparatus according to claim 39, wherein said rail has curved extremities and said intersecting rail means have mating surfaces to provide minimum aligned spacing and noninterfering pivotal motion.

41. Apparatus according to claim 39, wherein said rail is mounted on a shaft rotationally positioned by a collar and said wheel means is mounted on a pivot shaft aligned with the shaft mounting said rail.

* * * * *